UNITED STATES PATENT OFFICE.

FREDERICK BRONNER, OF VERA CRUZ, MEXICO.

IMPROVEMENT IN PRESERVING INDIA-RUBBER.

Specification forming part of Letters Patent No. 9,246, dated September 7, 1852.

*To all whom it may concern:*

Be it known that I, FREDERICK BRONNER, of Vera Cruz, Mexico, have discovered a mode of preserving the juice extracted from the india-rubber tree in its liquid state, retaining all its original qualities, so as to be able to have it sent across the sea and to be applied for manufacturing purposes in a novel way; and that I do hereby declare that the following is a full and exact description thereof.

The nature of my discovery is as follows: After extracting the juice from the tree at a certain season to mix each barrel with twenty pounds of campeche salt or muriate of soda, which process will keep it from fermenting and secure its transportation to the United States, where trials have been made and proved successful as to its remaining perfectly liquid and adapted to manufacturing purposes, hitherto not known in any country.

And be it further known that the nature of my discovery is by applying the before-mentioned quantity of campeche salt or muriate of soda to the rubber in its sap state, and that by so doing to prevent petrifaction and fermentation of the juice, to which more especially I confine the claim of my invention, and which I desire to secure by Letters Patent.

F. BRONNER.

Witnesses:
H. MARQUARD,
H. KÖPOKE.